United States Patent Office 2,777,838
Patented Jan. 15, 1957

2,777,838
POLYAZO-DYESTUFFS

Richard Huss, Arthur Siebert, and Josef Weissert, Frankfurt am Main, Germany, assignors to Farbwerke Hoechst Aktiengesellschaft vormals Meister Lucius & Bruning, Frankfurt am Main, Germany, a corporation of Germany No Drawing. Application May 21, 1954,
Serial No. 431,595

4 Claims. (Cl. 260—168)

The present invention relates to new polyazo-dyestuffs; more particularly it relates to the polyazo-dyestuffs corresponding to the following general formula

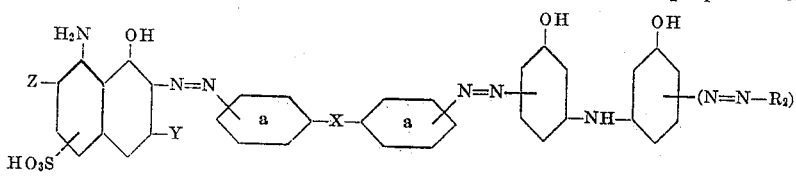

wherein Z represents hydrogen, the sulfonic acid group or the group —N=N—R₁, R₁ and R₂ represent aromatic radicals, X stands for the diphenyl bond, —CH=CH—, —NH—CO—NH—, —CO—, —O—, —S—, —NH— or —CONH—, Y represents hydrogen or the sulfonic acid group, and wherein the phenyl radicals $a$ may contain substituents.

We have found that new valuable polyazo-dyestuffs corresponding to the general constitution

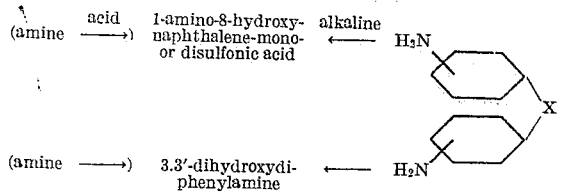

are obtained by coupling 1 molecular proportion of a tetrazo-compound of a diamine of the general formula

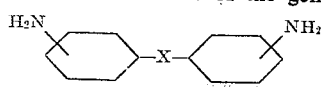

in which X has the meaning given above, and the two phenyl radicals may contain substituents, in an alkaline medium with 1 molecular proportion of a 1 - amino - 8 - hydroxynaphthalene-mono- or disulfonic acid or of a 1-amino - 8 - hydroxynaphthalene - mono- or disulfonic acid coupled in an acid medium with a diazo-compound, combining the diazo-azo-compound so obtained in an alkaline or acetic acid medium with 1 molecular proportion of a 3.3' - dihydroxy - diphenylamine and, if desired, coupling the resulting polyazo-dyestuff with any diazo- or diazo-azo-compound.

The invention also includes an alternative process for making polyazo-dyestuffs of the above constitution, wherein 1 molecular proportion of the tetrazotized diamino-compound is coupled in an alkaline medium with 1 molecular proportion of a 1 - amino - 8 - hydroxynaphthalene-mono- or disulfonic acid or of a 1 - amino - 8 - hydroxy- naphthalene-mono- or disulfonic acid coupled in an acid medium with a diazo-compound and the resulting diazo-azo-compound is combined in an alkaline medium with 1 molecular proportion of the azo-dyestuff obtained from a sulfonated diazo- or diazo-azo-compound and 3.3'-dihydroxy-diphenylamine.

The invention also includes a further process for making the aforesaid polyazo-dyestuffs, wherein 1 molecular proportion of the tetrazotized diamino-compound is coupled in an alkaline medium with 1 molecular proportion of a 1 - amino - 8 - hydroxynaphthalene - mono- or disulfonic acid or of a 1 - amino - 8 - hydroxynaphthalene-mono- or disulfonic acid coupled in an acid medium with a diazo-compound and the diazo-azo-compound so obtained and 1 molecular proportion of a diazo- or diazo-azo-compound are coupled simultaneously with 1 molecular proportion of 3.3'-dihydroxy-diphenylamine.

The new dyestuffs are readily soluble in water and are resistant to inorganic and organic acids as well as to alkalies and formaldehyde. They have a great affinity for leather fibres, and dye all kinds of leather by drum dyeing, brush dyeing or spray dyeing, deep full tints which range from violet, dark green through dark blue to black and possess a good to very good fastness to light.

The following examples serve to illustrate the invention but they are not intended to limit it thereto; the parts being by weight unless otherwise stated, and the relationship of parts by weight to parts by volume being the same as that of the kilogram to the liter:

Example 1

A diazo-suspension prepared in the usual manner from 173 parts of 1 - aminobenzene - 4 - sulfonic acid is coupled in an acid medium with 341 parts of 1 - amino - 8- hydroxynaphthalene - 3.6 - disulfonic acid (monosodium salt) and the coupling is completed by neutralizing the excess of the acid with a 2 N-solution of sodium acetate. To the suspension of the monoazo-dyestuff so obtained a tetrazo-solution prepared from 184 parts of 4.4'-diaminodiphenyl is added at 0° C.–5° C. and coupling is conducted in a weakly alkaline medium by adding 2000 parts by volume of a 2 N-solution of sodium hydroxide. After stirring the mixture for 30 minutes, the alkaline solution of 201 parts of 3.3' - dihydroxy - diphenylamine is added in one portion and the reaction-mixture so obtained is stirred overnight at a pH value of 10. When the coupling is complete, the solution of the trisazo-dyestuff is acidified, heated to 92° C., salted out with a small quantity of sodium chloride, filtered off with suction and dried. The dyestuff obtained as a grey-black powder is very readily soluble in water and resistant to inorganic and organic acids, as well as to formaldehyde and alkalies. The trisazo-dyestuff so obtained dyes all kinds of leather deep bluish-black uniform tints having a good covering power and very good fastness to light. It corresponds to the following formula

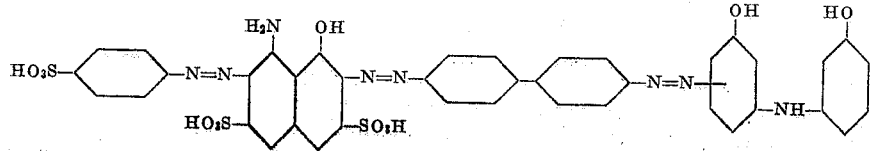

Example 2

A diazo-suspension prepared in the usual manner from 18.7 parts of 1 - amino - 4 - methylbenzene - 3 - sulfonic acid is coupled in the usual manner in an acid medium with 34.1 parts of 1 - amino - 8 - hydroxynaphthalene-3.6 - disulfonic acid (monosodium salt). To the acid suspension of the monoazo-dyestuff so obtained the clarified tetrazo-solution from 18.4 parts of 4.4'-diaminodiphenyl is then added and the mixture is combined with the monoazo-compound in a weakly alkaline medium by adding 30 parts of sodium carbonate. After stirring for 30 minutes, the resulting diazo-disazo-compound is coupled with 20.1 parts of 3.3' - dihydroxy - diphenylamine, the coupling medium having an alkaline reaction. When the coupling is complete, the trisazo-dyestuff is isolated as described in Example 1. The grey-black powder so obtained dyes various kinds of leather by drum dyeing, brush dyeing and spray dyeing reddish blue-black tints having a good fastness to light and resistance to inorganic and organic acids as well as to alkalies and formaldehyde.

Example 3

The trisazo-dyestuff described in Example 1 and having the constitution: 1-aminobenzene-4-sulfonic acid $\xrightarrow{\text{acid}}$ 1-amino-8-hydroxynaphthalene-3.6-disulfonic acid $\xrightarrow{\text{alkaline}}$ 4.4'-diaminodiphenyl $\xrightarrow{\text{alkaline}}$ 3.3'-dihydroxy-diphenylamine is converted into the tetrakisazo-dyestuff by coupling it in an alkaline medium at a pH value of 10 with 173 parts of 1-aminobenzene-4-sulfonic acid. When the coupling is complete, the dyestuff solution is rendered acid, heated to 92° C., salted out with a small quantity of sodium chloride, filtered off with suction and dried. The tetrakisazo-dyestuff is obtained in the form of a grey-black powder which is very readily soluble in water and has the same good fastness properties as the dyestuff described in Example 1. It dyes all kinds of leather by drum dyeing, brush dyeing and spray dyeing uniform bluish black tints which have, however, a better covering power and a very good fastness to light. The dyestuff corresponds to the following formula

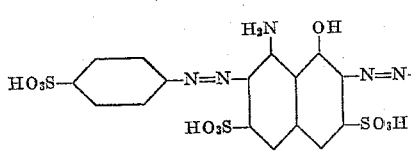

Example 4

A diazo-suspension from 207 parts of 1-amino-4-chlorobenzene-3-sulfonic acid is coupled in the usual manner in an acid medium with 341 parts of 1-amino-8-hydroxynaphthalene-4.6-disulfonic acid (monosodium salt) and the monoazo-dyestuff so obtained is then coupled in a weakly alkaline medium with a tetrazo-solution prepared from 184 parts of 4.4'-diaminodiphenyl, while adding 2000 parts by volume of a 2 N-solution of sodium hydroxide. After 30 minutes the resulting diazo-disazo-compound is coupled to form the trisazo-dyestuff by adding an alkaline solution of 201 parts of 3.3'-dihydroxydiphenylamine. The coupling solution is stirred overnight and a tetrakisazo-dyestuff is then obtained by simultaneously adding to the trisazo-dyestuff a diazo-suspension prepared from 207 parts of 1-amino-4-chlorobenzene-3-sulfonic acid and 200 parts by volume of a 5 N-solution of sodium hydroxide. The dyestuff is isolated as described in Example 3. The grey-black powder so obtained dyes all kinds of leather by various methods of dyeing weakly reddish dark-blue tints of very good fastness to light and covering power. The dyestuff has the same fastness properties as the dyestuff described in Example 1.

Example 5

The diazo-suspension prepared from 173 parts of 1-aminobenzene-4-sulfonic acid is coupled in an acid medium with 341 parts of 1-amino-8-hydroxynaphthalene-3.6-disulfonic acid (monosodium salt), as described in Example 1. The tetrazo-solution prepared from 184 parts of 4.4'-diaminodiphenyl is then poured into the mixture, and coupling is conducted in a weakly alkaline medium by adding 2000 parts by volume of a 2 N-solution of sodium hydroxide, while cooling with ice to 0° C.–5° C. After stirring for 30 minutes, the alkaline solution of 100 parts of 3.3'-dihydroxy-diphenylamine is added to the diazo-disazo-compound, and the alkaline reaction mixture is stirred overnight. When the coupling is complete, the dyestuff solution is rendered acid, heated to 92° C., precipitated with a small quantity of sodium chloride, filtered off with suction and dried. The hexakisazo-dyestuff is obtained in the form of a grey-black powder which is readily soluble in water and has remarkably good resistance to inorganic and organic acids, alkalies and formaldehyde. It dyes all kinds of leather deep bluish black tints having a good covering power and a good fastness to light.

Example 6

A diazo-suspension prepared from 22.3 parts of 1-aminonaphthalene-4-sulfonic acid is coupled in the usual manner in an acid medium with 34.1 parts of 1-amino-8-hydroxynaphthalene-4.6-disulfonic acid. The monoazo-compound so obtained is then combined in a weakly alkaline medium with a tetrazo-solution prepared from 36 parts of 4.4'-diamino-diphenylether-2.2'-disulfonic acid by adding 25 parts of sodium carbonate. After stirring for 30 minutes, an alkaline solution of 20.1 parts of 3.3'-dihydroxy-diphenylamine is added so that the coupling takes place at a pH value of 10. When the coupling is complete, the trisazo-dyestuff so obtained is combined in an alkaline medium with a diazo-suspension prepared from 17.3 parts of 1-aminobenzene-4-sulfonic acid to form the tetrakisazo-dyestuff which is isolated in the usual manner, filtered off with suction and dried. The dyestuff obtained in the form of a grey-black powder has the same

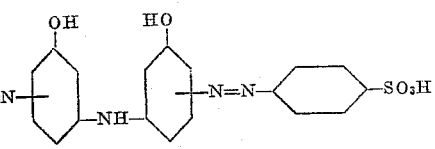

properties as the dyestuff described in Example 2 and dyes leather reddish black tints of very good fastness to light.

Example 7

A diazo-solution prepared from 253 parts of 1-aminobenzene-2.5-disulfonic acid is coupled in an acid medium in the usual manner with 341 parts of 1-amino-8-hydroxynaphthalene-3.6-disulfonic acid. When the coupling is complete, a tetrazo-solution prepared from 272 parts of 4.4'-diaminodiphenyl-3.3'-dicarboxylic acid is added and 36 parts of sodium carbonate are then introduced. The weakly alkaline solution is stirred for 30 minutes. The diazo-disazo-compound so obtained is then immediately coupled in an alkaline medium with 100 parts of 3.3'-dihydroxy-diphenylamine to form the hexakisazo-dyestuff. When the coupling is complete, the dyestuff is acidified, heated to 92° C., filtered off with suction and dried. The grey-black powder so obtained dyes all kinds of leather by various methods of dyeing violet tints having a good covering power and the fastness properties of the dyestuff described in Example 5.

Example 8

By coupling 1 molecular proportion of the diazo-disazo-compound described in Example 1 and having the following constitution: 1-aminobenzene-4-sulfonic acid $\xrightarrow{\text{acid}}$ 1 - amino - 8 - hydroxynaphthalene-3.6-disulfonic acid $\xleftarrow{\text{alkaline}}$ 4.4-diaminodiphenyl, in an alkaline medium with 0.95 molecular proportion of the monoazo-dyestuff obtained by coupling in an alkaline medium diazotized 1-aminobenzene-4-sulfonic acid with 3.3'-dihydroxy-diphenylamine, and isolating the coupling product after stirring it in the usual manner, a dyestuff is obtained which has the same good fastness and dyeing properties as the dyestuff described in Example 3.

Example 9

The clarified diazo-solution prepared from 17.3 parts of 1-amino-2-chloro-4-nitrobenzene is coupled in an acid medium with 34.1 parts of 1-amino-8-hydroxynaphthalene-3.6-disulfonic acid and the product so obtained is then coupled in an alkaline medium with the clarified tetrazo-solution prepared from 18.4 parts of 4.4'-diaminodiphenyl. After stirring for 30 minutes, the diazo-disazo-compound so obtained is immediately coupled with an azo-compound prepared by combining in an alkaline medium 20.1 parts of 3.3'-dihydroxy-diphenylamine with the diazo-solution from 34.1 parts of 1-amino-8-hydroxy-naphthalene-3.6-disulfonic acid. The resulting tetrakisazo-dyestuff is isolated as described in the foregoing examples. It dyes leather greenish dark-blue tints of good general fastness properties and very good fastness to light.

Example 10

1 molecular proportion of the monoazo-compound obtained by coupling in an acid medium 1 molecular proportion of diazotized 1-aminobenzene-4-sulfonic acid with 1 molecular proportion of 1-amino-8-hydroxynaphthalene-3.6-disulfonic acid, is combined with 1 molecular proportion of tetrazotized 4.4'-diamino-diphenyl while adding such a quantity of a 2 N-solution of sodium hydroxide to produce a pH value of 8. The diazo-disazo-compound so obtained is coupled in an alkaline medium with the trisazo-dyestuff which is prepared by coupling the monoazo-dyestuff of the following constitution: 4.4'-diamino-diphenyl $\xrightarrow{\text{acid}}$ 1-amino-8-hydroxynaphthalene-3.6-disulfonic acid in an alkaline medium with diazotized 1-aminobenzene-4-sulfonic acid and combining the intermediate-compound so obtained with 1 molecular proportion of 3.3'-dihydroxy-diphenylamine. When the coupling is complete, the alkaline solution of the hexakisazo-dyestuff is rendered acid, heated to 92° C., salted out with a small quantity of sodium chloride, filtered off with suction and dried. The dyestuff is obtained in the form of a grey-black powder which is readily soluble in water and has a good resistance to inorganic and organic acids, alkalies and formaldehyde. It dyes all kinds of leather by various methods of dyeing bluish black tints of good fastness to light. The dyestuff corresponds to the following formula:

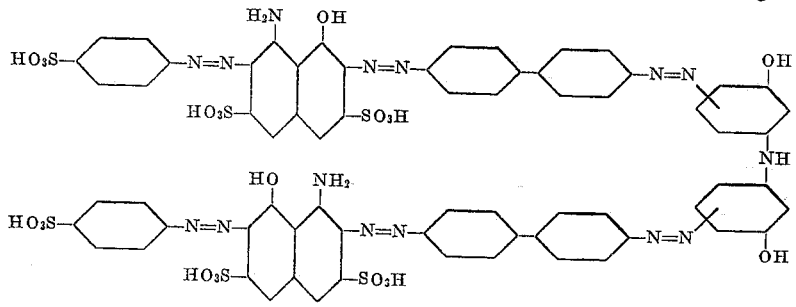

Example 11

As described in Example 10, 0.1 molecular proportion of the diazo-disazo-compound of the following constitution: 1-amino-benzene-4-sulfonic acid $\xrightarrow{\text{acid}}$ 1- amino - 8 - hydroxynaphthalene - 3.6 - disulfonic acid $\xleftarrow{\text{alkaline}}$ 4.4'-diaminodiphenyl is coupled in an alkaline medium with 0.1 molecular proportion of the trisazo-dyestuff of the following constitution: 1-amino-3-nitro-benzene-4-sulfonic acid → 1-amino-8-hydroxy-naphthalene-3.6-disulfonic acid $\xleftarrow{\text{acid}}$ 4.4'-diaminodiphenyl $\xrightarrow{\text{alkaline}}$ 3.3'-dihydroxy-diphenylamine. When the coupling is complete, the reaction product is isolated in the usual manner. The hexakisazo-dyestuff so obtained has the same good fastness properties as the dyestuff described in Example 10 and dyes leather deep blue-black tints of very good fastness to light.

Example 12

The same dyestuff as described in Example 10 is obtained by coupling in an alkaline medium the trisazo-dyestuff of the following constitution: 1-aminobenzene-4-sulfonic acid $\xrightarrow{\text{acid}}$ 1-amino-8-hydroxynaphthalene-3.6-disulfonic acid $\xleftarrow{\text{alkaline}}$ 4.4'-diaminodiphenyl → 3.3'-dihydroxy-diphenylamine with the diazo-disazo-compound of the following constitution: 1-aminobenzene-4-sulfonic acid → 1-amino-8-hydroxynaphthalene-3.6-disulfonic acid $\xleftarrow{\text{acid}}$ 4.4'-diaminodiphenyl. The hexakisazo-dyestuff so obtained corresponds with respect to its fastness and dyeing properties with the dyestuff described in Example 10.

Example 13

1 molecular proportion of the trisazo-dyestuff of the following constitution: 1-amino-2-chlorobenzene-4-sulfonic acid $\xrightarrow{\text{acid}}$ 1-amino-8-hydroxynaphthalene-3.6-disulfonic acid $\xleftarrow{\text{alkaline}}$ 4.4'-diaminodiphenyl → 3.3'-dihydroxy-diphenylamine is coupled in an alkaline medium with 1 molecular proportion of the diazo-disazo-compound of the following constitution: 1-aminobenzene-4-sulfonic acid $\xrightarrow{\text{alkaline}}$ 1-amino-8-hydroxynaphthalene-3.6-disulfonic acid $\xleftarrow{\text{acid}}$ 4.4'-diaminodiphenyl and the dyestuff so obtained is isolated in the usual manner. The hexakisazo-dyestuff dyes all kinds of leather by drum dyeing, brush dyeing and spray dyeing deep blue black tints of very good fastness properties.

Example 14

A hexakisazo-dyestuff is obtained by adding in an alkaline medium to 1 molecular proportion of the diazo-disazo-compound of the following constitution: 1 aminobenzene-4-sulfonic acid $\xrightarrow{\text{acid}}$ 1-amino-8-hydroxynaphthalene-3.6-disulfonic acid $\xleftarrow{\text{alkaline}}$ 4.4'diaminodiphenyl, while stirring well, 1 molecular proportion of the diazo-disazo-compound of the following constitution: 1-amino-benzene-4-sulfonic acid $\xrightarrow{\text{alkaline}}$ 1-amino-8-hydroxynaphthalene-3.6-disulfonic acid $\xleftarrow{\text{acid}}$ 4.4'-diaminodiphenyl and then introducing the alkaline solution of 1 molecular proportion of 3.3'-dihydroxy-diphenylamine in one portion. It is isolated in the usual manner and represents a grey-black powder which is readily soluble in water and has the same good fastness and dyeing properties as the dyestuffs described in Examples 10 and 12.

amine to form the tetrakisazo-dyestuff which is isolated as described in the foregoing examples. The grey-black powder so obtained dyes leather dark-blue tints having a good covering power and good fastness properties. The dyestuff corresponds to the following formula

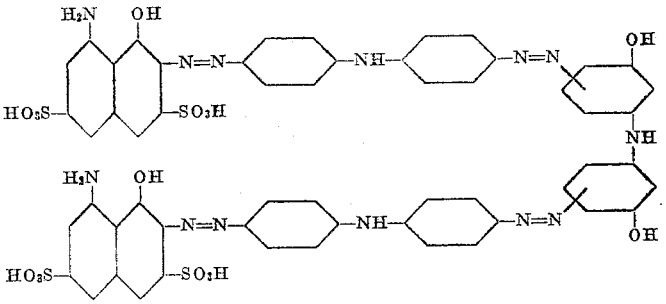

Example 15

0.1 molecular proportion each of the two diazo-disazo-compounds prepared as described in the foregoing examples and having the following constitutions:

(a) 1-aminobenzene-4-sulfonic acid $\xrightarrow{acid}$ 1-amino-8-hydroxynaphthalene-3.6-disulfonic acid $\xleftarrow{alkaline}$ 4.4'-diaminodiphenyl and (b) 1-amino-4-chlorobenzene-3-sulfonic acid $\xrightarrow{acid}$ 1-amino-8-hydroxynaphthalene-4.6-disulfonic acid $\xleftarrow{alkaline}$ 4.4'-diamino-3.3'-dimethyldiphenyl are poured together and, after mixing well, combined in an alkaline medium with an alkaline solution of 0.1 molecular proportion of 3.3'-dihydroxy-diphenylamine to form the hexakisazo-dyestuff. It is isolated in the usual manner and dyes leather deep blue-black tints of good fastness properties.

Example 16

The diazo-suspension prepared from 173 parts of 1-amino-benzene-4-sulfonic acid is coupled in an acid medium with 341 parts of 1-amino-8-hydroxynaphthalene-3.6-disulfonic acid. When the coupling is complete, the clarified tetrazo-solution of 184 parts of 4.4'-diaminodiphenyl is added to the monoazo compound, and 300 parts of sodium carbonate are then strewn in. The weakly alkaline reaction mixture is stirred for 30 minutes. The diazo-disazo-compound so obtained is then immediately combined in an alkaline medium with the azo-compound obtained by coupling in an alkaline medium 201 parts of 3.3'-dihydroxydiphenylamine with a diazo-suspension prepared from 239 parts of 1-amino-2-hydroxynaphthalene-4-sulfonic acid. When the coupling is complete, the tetrakisazo-dyestuff obtained is isolated in the usual manner. The grey-black powder dyes all kinds of leather by various methods of dyeing deep, full dark-blue tints having a good covering power and a very good fastness to light. The dyestuff is resistant to inorganic and organic acids as well as to alkalies and formaldehyde. It corresponds to the following formula

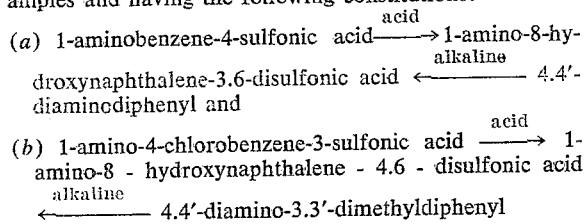

Example 17

341 parts of 1-amino-8-hydroxynaphthalene-3.6-disulfonic acid are combined in an alkaline medium with the tetrazo compound of 199 parts of 4.4'-diamino-diphenylamine. When the coupling is complete, the coupling product is combined in an alkaline medium with an alkaline solution of 100 parts of 3.3'-dihydroxy-diphenyl-

Example 18

The alkaline solution of the diazo-disazo-compound which is obtained as described in Example 1 and has the following constitution: 1-aminobenzene - 4 - sulfonic acid $\xrightarrow{acid}$ 1-amino-8-hydroxynaphthalene - 3.6 - disulfonic acid $\xleftarrow{alkaline}$ 4.4'-diaminodiphenyl, is stirred for 30 minutes and then adjusted to a pH value of 4 by adding about 50 parts by volume of a 5 N-solution of hydrochloric acid. After the addition of 60 parts of glacial acetic acid, a solution rendered alkaline with sodium hydroxide of 201 parts of 3.3'-dihydroxy-diphenylamine and 60 parts of glacial acetic acid are added simultaneously drop by drop in the course of 2 hours. Due to the buffering action of the sodium acetate which is formed, the coupling to form the trisazo-dyestuff takes place at a pH value of 4. When the coupling is complete, the trisazo-dyestuff is coupled in an alkaline medium with a diazo-suspension prepared from 173 parts of 1-aminobenzene-4-sulfonic acid to form the tetrakisazo-dyestuff which is isolated in the usual manner by acidifying, heating to 92° C., cooling, filtering off with suction and drying. The grey-black powder so obtained dyes all kinds of leather by various methods of dyeing the same deep black tints as the dyestuff described in Example 3 having a good covering power and very good fastness to light. The dyestuff is resistant to inorganic and organic acids as well as to alkalies and formaldehyde.

Example 19

The diazo-disazo-compound obtainable as described in Example 1 and having the constitution: 1-aminobenzene-4-sulfonic acid $\xrightarrow{acid}$ 1-amino-8-hydroxynaphthalene-3.6-disulfonic acid $\xleftarrow{alkaline}$ 4.4'-diaminodiphenyl is mixed, while stirring well, with a diazo-suspension prepared from 173 parts of 1-aminobenzene-4-sulfonic acid. Into this mixture an alkaline solution of 201 parts of 3.3'-dihydroxydiphenylamine and 100 parts by volume of a 10 N-solution of sodium hydroxide are introduced so that the coupling takes place in a strongly alkaline medium. When the coupling is complete, the tetrakisazo-dyestuff is isolated in the usual manner, filtered off with suction and dried. The dyestuff so obtained has the same fastness and dyeing properties as the dyestuff described in Example 3 and dyes all kinds of leather bluish black tints.

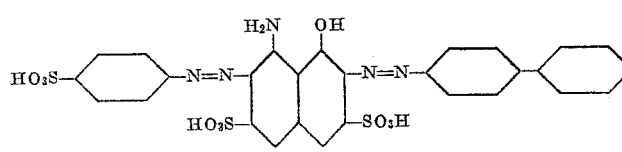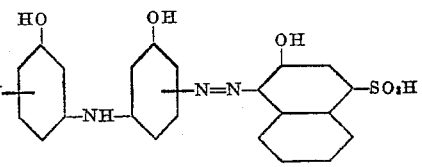

In the following table are given a number of further polyazo-dyestuffs of this invention which dye leather similar tints having the same good fastness properties:

| Constitution | Tint |
|---|---|
| 1. 1-aminobenzene-4-sulfonic acid $\xrightarrow{acid}$ 1-amino-8-hydroxynaphthalene-4-sulfonic acid $\longleftarrow$ 4.4'-diamino-diphenyl $\longrightarrow$ 3.3'-dihydroxydiphenylamine. | blue-violet. |
| 2. 1-aminobenzene-4-sulfonic acid $\xrightarrow{acid}$ 1-amino-8-hydroxynaphthalene-3.6-disulfonic acid $\longleftarrow$ 4.4'-diamino-diphenylamine $\longrightarrow$ 3.3'-dihydroxy-diphenylamine. | dark blue. |
| 3. 1-amino-8-hydroxynaphthalene-3.6-disulfonic acid $\xleftarrow{alkaline}$ 4.4'-diamino-diphenylamine $\longrightarrow$ monoazo-compound 3.3'-dihydroxy-diphenylamine $\xleftarrow{acid}$ 1-aminobenzene-4-sulfonic acid. | Do. |
| 4. 1-aminobenzene-4-sulfonic acid $\xrightarrow{acid}$ 1-amino-8-hydroxynaphthalene-3.6-disulfonic acid $\longleftarrow$ 4.4'-diamino-diphenyl $\longrightarrow$ monoazo-compound 3.3'-dihydroxy-diphenylamine $\xleftarrow{acid}$ 1-amino-benzene-4-sulfonic acid. | reddish dark blue. |
| 5. 1-aminobenzene $\xrightarrow{acid}$ 1-amino-8-hydroxy-naphthalene-3.6-disulfonic acid $\longleftarrow$ 4.4'-diamino-diphenyl $\longrightarrow$ monoazo-compound 3.3'-dihydroxy-diphenylamine $\xleftarrow{acid}$ 1-aminobenzene-4-sulfonic acid. | greenish dark blue. |
| 6. 1-aminobenzene $\xrightarrow{acid}$ 1-amino-8-hydroxynaphthalene-3.6-disulfonic acid $\xleftarrow{alkaline}$ 4.4'-diamino-diphenyl $\longrightarrow$ monoazo-compound 3.3'-dihydroxy-diphenylamine $\xleftarrow{alkaline}$ 1-aminobenzene-4-sulfonic acid. | reddish dark blue. |
| 7. 1-amino-8-hydroxynaphthalene-2.4-disulfonic acid $\xleftarrow{alkaline}$ 4.4'-diamino-diphenyl $\longrightarrow$ 3.3'-dihydroxy-diphenylamine $\xleftarrow{alkaline}$ 4.4'-diamino-diphenyl $\longrightarrow$ 1-amino-8-hydroxynaphthalene-2.4-disulfonic acid. | black with a violet hue. |
| 8. 1-amino-3-nitrobenzene-4-sulfonic acid $\xrightarrow{acid}$ 1-amino-8-hydroxynaphthalene-3.6-disulfonic acid $\longleftarrow$ 4.4'-diamino-3.3'-dimethyl-diphenyl $\longrightarrow$ 3.3'-dihydroxy-diphenylamine $\longleftarrow$ 1-aminobenzene-2.5-disulfonic acid. | greenish dark blue. |
| 9. 1-aminobenzene-4-sulfonic acid $\xrightarrow{acid}$ 1-amino-8-hydroxynaphthalene-3.6-disulfonic acid $\longleftarrow$ 4.4'-diamino-diphenyl-urea $\longrightarrow$ 3.3'-dihydroxy-diphenylamine $\longleftarrow$ 1-aminobenzene-4-sulfonic acid. | greenish black. |
| 10. 1-aminobenzene-4-sulfonic acid $\xrightarrow{acid}$ 1-amino-8-hydroxynaphthalene-3.6-disulfonic acid $\longleftarrow$ 4.4'-diamino-benzophenone $\longrightarrow$ 3.3'-dihydroxy-diphenylamine $\longleftarrow$ 1-amino-benzene-4-sulfonic acid. | bluish black. |
| 11. 1-aminobenzene-2.5-disulfonic acid $\xrightarrow{acid}$ 1-amino-8-hydroxynaphthalene-3.6-disulfonic acid $\longleftarrow$ 4.4'-diamino-diphenylsulfide $\longrightarrow$ 3.3'-dihydroxy-diphenylamine $\longleftarrow$ 1-aminobenzene-4-sulfonic acid. | greenish black. |
| 12. 1-amino-4-chlorobenzene $\xrightarrow{acid}$ 1-amino-8-hydroxynaphthalene-3.6-disulfonic acid $\longleftarrow$ 4.4'-diamino-diphenyl $\longrightarrow$ 3.3'-dihydroxy-diphenylamine $\longleftarrow$ 1-aminobenzene-2.5-disulfonic acid. | reddish blue-black. |
| 13. 1-amino-4-nitrobenzene $\xrightarrow{acid}$ 1-amino-8-hydroxy-naphthalene-3.6-disulfonic acid $\longleftarrow$ 4.4'-diaminostilbene-2.2'-disulfonic acid $\longrightarrow$ 3.3'-dihydroxy-diphenylamine $\longleftarrow$ 1-aminobenzene-4-sulfonic acid. | greenish black. |
| 14. 1-aminobenzene-4-sulfonic acid $\xrightarrow{acid}$ 1-amino-8-hydroxynaphthalene-4-sulfonic acid $\longleftarrow$ 4.4'-diamino-diphenyl $\longrightarrow$ 3.3'-dihydroxy-diphenylamine $\longleftarrow$ 1-aminobenzene-2.5-disulfonic acid. | blue-violet. |
| 15. 1-aminobenzene $\xrightarrow{acid}$ 1-amino-8-hydroxy-naphthalene-3.6-disulfonic acid $\longleftarrow$ 4.4'-diamino-diphenyl $\longrightarrow$ monoazo-compound 1-amino-8-hydroxynaphthalene-3.6-disulfonic acid $\xrightarrow{alkaline}$ 3.3'-dihydroxy-diphenylamine. | reddish dark blue. |
| 16. 1-aminobenzene-4-sulfonic acid $\xrightarrow{acid}$ 1-amino-8-hydroxynaphthalene-3.6-disulfonic acid $\longleftarrow$ 4.4'-diamino-diphenyl $\longrightarrow$ monoazo-compound 1-amino-8-hydroxynaphthalene-3.6-disulfonic acid $\xrightarrow{alkaline}$ 3.3'-dihydroxy-diphenylamine. | greenish dark blue. |
| 17. 1-aminobenzene-4-sulfonic acid $\xrightarrow{acid}$ 1-amino-8-hydroxynaphthalene-3.6-disulfonic acid $\longleftarrow$ 4.4'-diamino-3.3'-diphenoxy-acetic acid $\longrightarrow$ monoazo-compound 1-amino-8-hydroxy-naphthalene-3.6-disulfonic acid $\longrightarrow$ 3.3'-dihydroxy-diphenylamine. | strongly greenish dark blue. |
| 18. 1-aminobenzene-4-sulfonic acid $\xrightarrow{acid}$ 1-amino-8-hydroxynaphthalene-3.6-disulfonic acid $\longleftarrow$ 4.4'-diamino-diphenyl $\xrightarrow{acetic acid}$ monoazo-compound 3.3'-dihydroxy-diphenylamine $\longleftarrow$ 1-amino-8-hydroxynaphthalene-3.6-disulfonic acid. | dark blue. |
| 19. 1-amino-4-nitrobenzene-2-sulfonic acid $\xrightarrow{acid}$ 1-amino-8-hydroxynaphthalene-3.6-disulfonic acid $\longleftarrow$ 4-4'-diamino-diphenyl $\xrightarrow{acetic acid}$ monoazo-compound 3.3'-dihydroxy-diphenylamine $\longleftarrow$ 1-amino-8-hydroxynaphthalene-3.6-disulfonic acid. | Do. |
| 20. 1-amino-2-nitrobenzene-4-sulfonic acid $\xrightarrow{acid}$ 1-amino-8-hydroxynaphthalene-3.6-disulfonic acid $\longleftarrow$ 4.4'-diamino-diphenyl $\xrightarrow{acetic acid}$ monoazo-compound 3.3'-dihydroxy-diphenylamine $\longleftarrow$ 1-amino-8-hydroxynaphthalene, 3.6-disulfonic acid. | Do. |
| 21. 1-amino-2-chloro-4-nitrobenzene $\xrightarrow{acid}$ 1-amino-8-hydroxynaphthalene-3.6-disulfonic acid $\longleftarrow$ 4.4'-diamino-diphenyl $\longrightarrow$ 3.3'-dihydroxy-diphenylamine $\longleftarrow$ 1-aminobenzene-2.5-disulfonic acid. | grey-black. |
| 22. 1-amino-2-chloro-4-nitrobenzene $\xrightarrow{acid}$ 1-amino-8-hydroxynaphthalene-3.6-disulfonic acid $\longleftarrow$ 4.4'-diamino-diphenyl $\longrightarrow$ 3.3'-dihydroxy-diphenylamine $\longleftarrow$ 4-amino-4'-nitrodiphenylamine-2'-sulfonic acid. | black. |
| 23. 1-aminobenzene-2-carboxylic acid $\xrightarrow{acid}$ 1-amino-8-hydroxynaphthalene-3.6-disulfonic acid $\longleftarrow$ 4.4'-diamino-diphenyl $\longrightarrow$ monoazo-compound 3.3'-dihydroxy-diphenylamine $\xleftarrow{alkaline}$ 1-amino-8-hydroxynaphthalene-3.6-disulfonic acid. | dark blue. |
| 24. 1-aminobenzene-2-carboxylic acid $\xrightarrow{acid}$ 1-amino-8-hydroxynaphthalene-3.6-disulfonic acid $\longleftarrow$ 4.4'-diamino-diphenyl $\longrightarrow$ monoazo-compound 3.3'-dihydroxy-diphenylamine $\xleftarrow{alkaline}$ 1-amino-2-hydroxynaphthalene-4-sulfonic acid. | reddish dark blue. |
| 25. 1-amino-2-chloro-4-nitrobenzene $\xrightarrow{acid}$ 1-amino-8-hydroxynaphthalene-3.6-disulfonic acid $\longleftarrow$ 4.4'-diamino-diphenylamine $\longrightarrow$ monoazo-compound 3.3'-dihydroxy-diphenylamine $\xleftarrow{alkaline}$ 1-amino-2-hydroxynaphthalene-4-sulfonic acid. | dark blue. |
| 26. 1-amino-8-hydroxynaphthalene-3.6-disulfonic acid $\xleftarrow{alkaline}$ 4.4'-diamino-diphenylamine $\xrightarrow{acetic acid}$ 3.3'-dihydroxy-diphyenlamine. | Do. |
| 27. 1-amino-4-nitrobenzene-2-sulfonic acid $\xrightarrow{acid}$ 1-amino-8-hydroxynaphthalene-3.6-disulfonic acid $\longleftarrow$ 4.4'-diaminostilbene-2.2'-disulfonic acid $\longrightarrow$ 3.3'-dihydroxy-diphenylamine $\longleftarrow$ 1-aminobenzene-2.5-disulfonic acid. | greenish dark blue. |
| 28. 1-aminobenzene-4-sulfonic acid $\xrightarrow{acid}$ 1-amino-8-hydroxynaphthalene-3.6-disulfonic acid $\longleftarrow$ 4.4'-diamino-diphenyl $\longrightarrow$ 3.3'-dihydroxy-diphenylamine $\longleftarrow$ 4.4'-diamino-diphenyl $\xrightarrow{acid}$ 1-amino-8-hydroxynaphthalene-3.6-disulfonic acid. | greenish black. |
| 29. 1-aminobenzene-4-sulfonic acid $\xrightarrow{acid}$ 1-amino-8-hydroxynaphthalene-3.6-disulfonic acid $\longleftarrow$ 4.4'-diamino-diphenyl $\longrightarrow$ 3.3'-dihydroxy-diphenylamine $\longleftarrow$ 4-amino-1.1'-azobenzene-4'-sulfonic acid. | greenish dark blue. |
| 30. 1-aminobenzene-4-sulfonic acid $\xrightarrow{acid}$ 1-amino-8-hydroxynaphthalene-4-sulfonic acid $\longleftarrow$ 4.4'-diamino-diphenyl $\longrightarrow$ 3.3'-dihydroxy-diphenylamine $\longleftarrow$ 4.4'-diamino-diphenyl $\longrightarrow$ 1-amino-8-hydroxynaphthalene-4-sulfonic acid $\xleftarrow{acid}$ 1-aminobenzene-4-sulfonic acid. | blue-violet. |
| 31. 1-aminobenzene-2.5-disulfonic acid $\xrightarrow{acid}$ 1-amino-8-hydroxynaphthalene-4.6-disulfonic acid $\longleftarrow$ 4.4'-diamino-diphenyl $\longrightarrow$ 3.3'-dihydroxy-diphenylamine $\longleftarrow$ 4.4'-diamino-diphenyl $\longrightarrow$ 1-amino-8-hydroxynaphthalene-4.6-disulfonic acid $\xleftarrow{acid}$ 1-aminobenzene-2.5-disulfonic acid. | greenish dark blue. |

| Constitution | Tint |
|---|---|
| 32. 1-aminobenzene-4-sulfonic acid $\xrightarrow{\text{acid}}$ 1-amino-8-hydroxynaphthalene-3,6-disulfonic acid $\xleftarrow{}$ N-(para-amino-benzoyl)-1,3-diaminobenzene $\xrightarrow{}$ 3,3'-di-hydroxy-diphenylamine $\xleftarrow{}$ 1-aminobenzene-4-sulfonic acid. | black. |
| 33. 1-aminobenzene-4-sulfonic acid $\xrightarrow{\text{acid}}$ 1-amino-8-hydroxynaphthalene-3,6-disulfonic acid $\xleftarrow{}$ N-(meta-aminobenzoyl)-1,3-diaminobenzene $\xrightarrow{}$ 3,3'-dihydroxy-diphenylamine $\xleftarrow{}$ 1-amino-benzene-4-sulfonic acid. | Do. |
| 34. 1-aminobenzene-4-sulfonic acid $\xrightarrow{\text{acid}}$ 1-amino-8-hydroxynaphthalene-5-sulfonic acid $\xleftarrow{}$ 4,4'-diamino-diphenyl $\xrightarrow{}$ 3,3'-dihydroxy-diphenyl-amine $\xleftarrow{}$ 1-aminobenzene-4-sulfonic acid. | blue-black. |
| 35. 1-amino-8-hydroxynaphthalene-4,6-disulfonic acid $\xleftarrow{\text{alkaline}}$ 4,4'-diamino-diphenyl amine $\xrightarrow{\text{acetic acid}}$ 3,3'-di-hydroxy-diphenylamine. | reddish dark blue. |

We claim:
1. Polyazo-dyestuffs corresponding to the following general formula

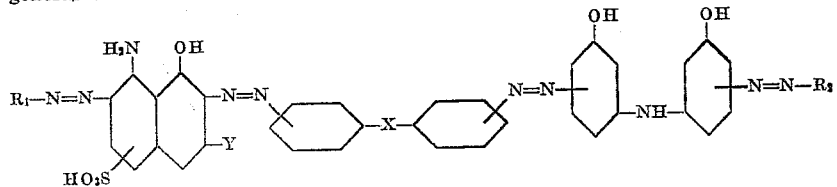

wherein $R_1$ and $R_2$ represent aromatic radicals selected from the group consisting of radicals of the benzene and naphthalene series, X stands for one of the group consisting of the diphenyl bond, —CH=CH—,

—NH—CO—NH—, —CO—, —O—, —S—, —NH— and —CONH—, and Y stands for a member of the group consisting of hydrogen and the sulfonic acid group, and wherein the dyestuff molecule contains at least two sulfonic acid groups.

2. Polyazo-dyestuffs corresponding to the following general formula

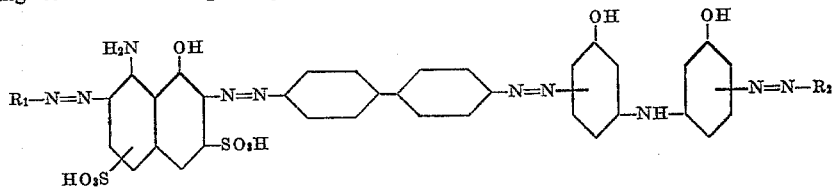

wherein $R_1$ and $R_2$ represent aromatic radicals selected from the group consisting of radicals of the benzene and naphthalene series.

3. The polyazo-dyestuff corresponding to the following formula

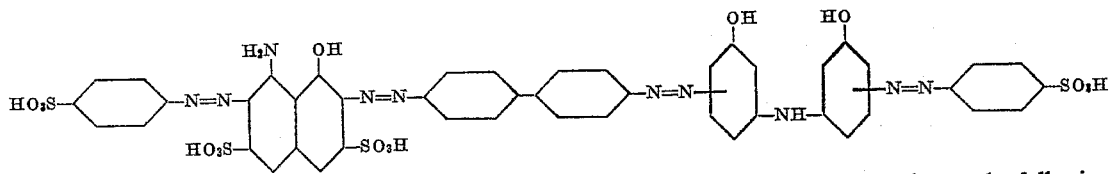

4. The polyazo-dyestuff corresponding to the following formula

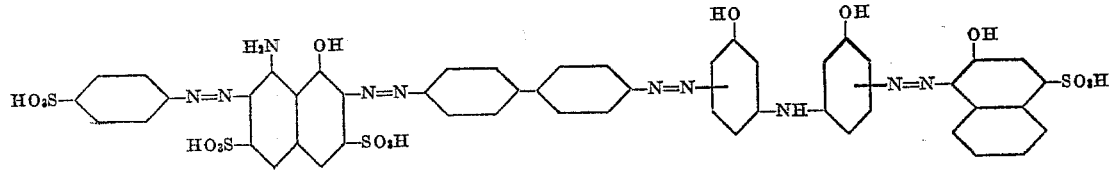

References Cited in the file of this patent
UNITED STATES PATENTS
2,239,005 Krebser _____ Apr. 22, 1941
FOREIGN PATENTS
578,001 Great Britain _____ June 11, 1946